(12) United States Patent
Tran

(10) Patent No.: US 9,417,920 B2
(45) Date of Patent: Aug. 16, 2016

(54) METHOD AND APPARATUS FOR DYNAMIC RESOURCE PARTITION IN SIMULTANEOUS MULTI-THREAD MICROPROCESSOR

(71) Applicant: FREESCALE SEMICONDUCTOR, INC., Austin, TX (US)

(72) Inventor: Thang M. Tran, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 242 days.

(21) Appl. No.: 14/046,438

(22) Filed: Oct. 4, 2013

(65) Prior Publication Data

US 2015/0100965 A1    Apr. 9, 2015

(51) Int. Cl.
*G06F 9/50* (2006.01)

(52) U.S. Cl.
CPC ........ G06F 9/5011 (2013.01); *G06F 2209/507* (2013.01); *G06F 2209/5021* (2013.01)

(58) Field of Classification Search
None
See application file for complete search history.

(56) References Cited

U.S. PATENT DOCUMENTS

| | | | | |
|---|---|---|---|---|
| 6,618,167 B1* | 9/2003 | Shah | ...................... | G06F 3/1205 358/1.13 |
| 7,310,722 B2* | 12/2007 | Moy | ...................... | G06F 9/3851 712/207 |
| 7,752,426 B2 | 7/2010 | Nye et al. | | |
| 7,890,735 B2 | 2/2011 | Tran | | |
| 2006/0265555 A1* | 11/2006 | Davis | ...................... | G06F 9/3851 711/147 |
| 2009/0089792 A1* | 4/2009 | Johnson | ................ | G06F 9/4881 718/105 |
| 2010/0299499 A1* | 11/2010 | Golla | ..................... | G06F 9/3851 712/206 |
| 2012/0221796 A1 | 8/2012 | Tran | | |
| 2012/0303935 A1 | 11/2012 | Tran et al. | | |
| 2012/0303936 A1 | 11/2012 | Tran et al. | | |
| 2012/0324209 A1 | 12/2012 | Tran et al. | | |
| 2013/0046936 A1 | 2/2013 | Tran | | |

OTHER PUBLICATIONS

Gautham K. Dorai and Donald Yeung, "Transparent Threads: Resource Sharing in SMT Processors for High Single-Thread Performance," *Proceedings of the 11th Annual International Conference on Parallel Architectures and Compilation Techniques*, Charlottesville, Va., 12 pages, 2002.
Francisco J. Cazorla, Alex Ramirez, Mateo Valero, and Enrique Fernandez, "Dynamically Controlled Resource Allocation in SMT Processors," *Proceedings of the 37th International Symposium on Microarchitecture (MICRO-37'04)*, 12 pages, 2004.
"Superscalar," *Wikipedia*, 4 pages, Feb. 23, 2013.
"CPU cache," *Wikipedia*, 21 pages, Feb. 24, 2013.
"Simultaneous multithreading," *Wikipedia*, 5 pages, Feb. 26, 2013.
"Thread (computing)," *Wikipedia*, 8 pages, Mar. 6, 2013.

* cited by examiner

*Primary Examiner* — Abdullah Al Kawsar
*Assistant Examiner* — Jorge A Chu Joy-Davila

(57) ABSTRACT

A method includes, in one implementation, receiving a first set of instructions of a first thread, receiving a second set of instructions of a second thread, and allocating queues to the instructions from the first and second sets. During a time when the first and second threads are simultaneously being processed, changeable number of queues can be allocated to the first thread based on factors such as the first and/or second thread's requirements or priorities, while maintaining a minimum specified number of queues that are allocated to the first and/or second thread. When needed, one thread may be stalled so that at least the minimum number of queues remains reserved for another thread while attempting to satisfy thread-priority requests or queue-requirement requests.

17 Claims, 3 Drawing Sheets

METHOD AND APPARATUS FOR DYNAMIC RESOURCE PARTITION IN SIMULTANEOUS MULTI-THREAD MICROPROCESSOR

FIELD OF THE INVENTION

The present disclosure relates in general to computer processors, and particularly to multi-thread microprocessors.

BACKGROUND

A driving force in microprocessor design is to increase the speed at which computer instructions are executed. One approach is the multi-core design, which includes multiple central processing units (CPUs) in a single microprocessor circuit. Another approach is to design CPUs with multiple internal functional units that can be used in parallel. For example, various multi-thread microprocessors can allow several independent threads of program instructions to be executed concurrently, sharing the internal resources of one CPU.

In CPUs designed for simultaneous multi-threading (SMT), several components of a CPU can be used simultaneously to execute several instruction threads. In various situations, SMT can provide efficient use of microprocessor resources. However, many SMT designs suffer from problems that arise during execution time when instruction threads are being processed by the CPU. One issue is the fairness of real-time resource allocation of the CPU resources among the various threads. A related issue is uncertainty in execution time for individual threads. In various situations, one thread may be "starved" for an undesirably long time while one or more resources on a CPU are assigned to different thread. Such delays can make a thread's execution time unpredictable. This unpredictability can pose problems for thread management systems, and can complicate the task of software design.

BRIEF DESCRIPTION OF THE DRAWINGS

A skilled practitioner will appreciate the benefits, features, and advantages of the present disclosure with reference to the following description and accompanying drawings where.

DETAILED DESCRIPTION

The following description is presented to enable one of ordinary skill in the art to make and use the technology of the present disclosure as provided within the context of particular applications and their requirements. Various modifications to the disclosed embodiments will be apparent to one skilled in the art, and the general principles described herein may be applied to other embodiments. Therefore, this disclosure is not intended to be limited to the particular embodiments shown and described herein, but is to be accorded the widest scope consistent with the principles and novel features herein disclosed.

Figure 1:
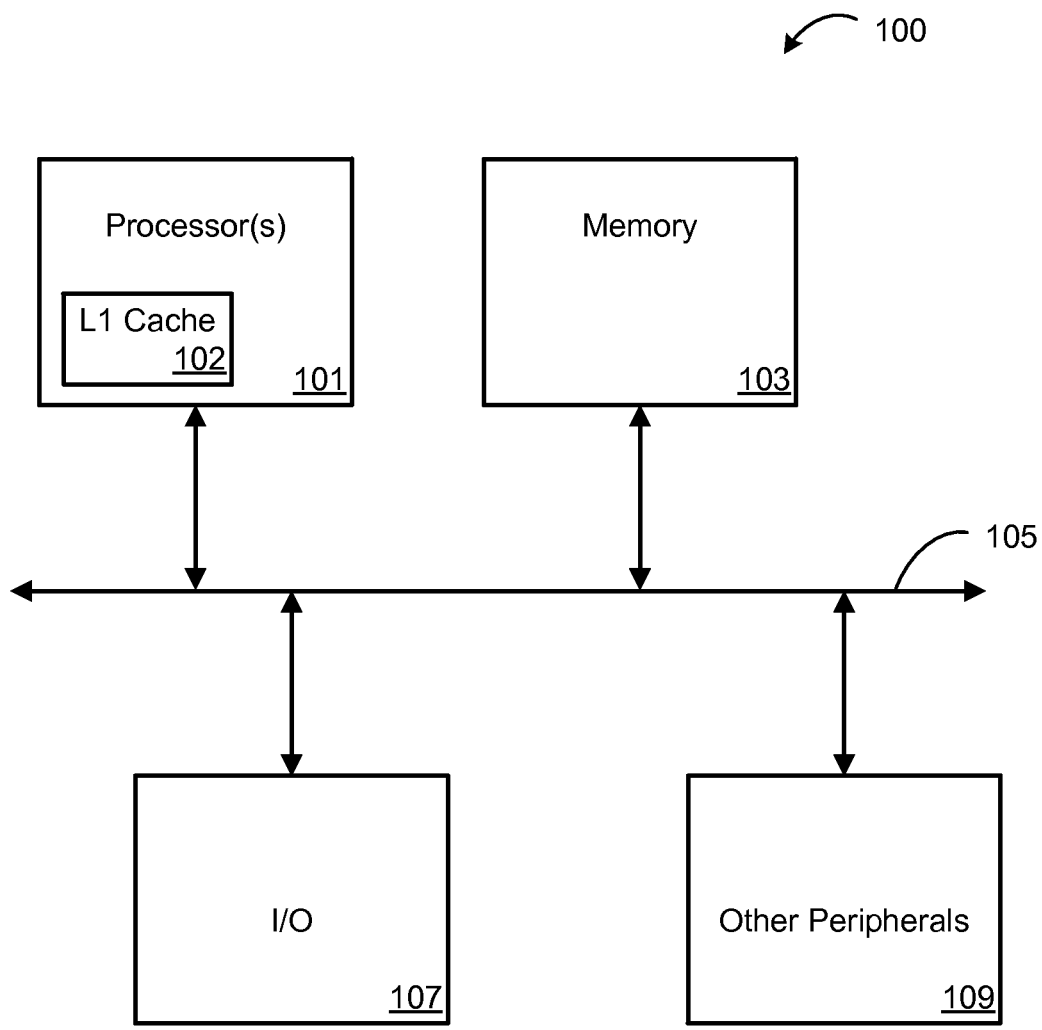
FIG. 1 is a block diagram showing an example of a computer system with a multi-thread processor according to one embodiment of the disclosure.

FIG. 1 is a block diagram showing an example of a computer system 100 with a multi-thread processor 101 according to one embodiment of the disclosure. In various implementations, system 100 is a superscalar microprocessor architecture. Components in the illustrated system 100 include multithread processor 101 with a Level 1 cache 102, a memory 103, input/output (I/O) handlers/interfaces 107, and other peripheral devices or modules 109 that are bi-directionally coupled to a bus 105 to allow communication between components.

Bus 105 may communicate with elements external to computer processing system 100. Alternate embodiments of the present disclosure may use more, less, or different components and functional blocks than those illustrated in FIG. 1. As some possible examples, alternate embodiments of computer processing system 100 may include a timer, a serial peripheral interface, a digital-to-analog converter, an analog-to digital converter, a driver (e.g. a liquid crystal display driver), and/or a plurality of types of memory.

In alternate embodiments, system 100 may include one, two, or any number of processors 101. If a plurality of processors 101 are used in computer processing system 100, any number of them may be the same type, or of different types. Although computer processing system 100 may have a plurality of processors 101, a single processor 101 by itself can execute a plurality of instruction threads.

Memory 103 can include a multi-level cache architecture including one or more levels of instruction cache and data cache. Storage in memory 103 may have slower access rates than Level 1 cache 102. Memory 103 can also include an external memory that is also referred to as a main memory and can optionally include additional devices such as buffers and the like.

Figure 2:
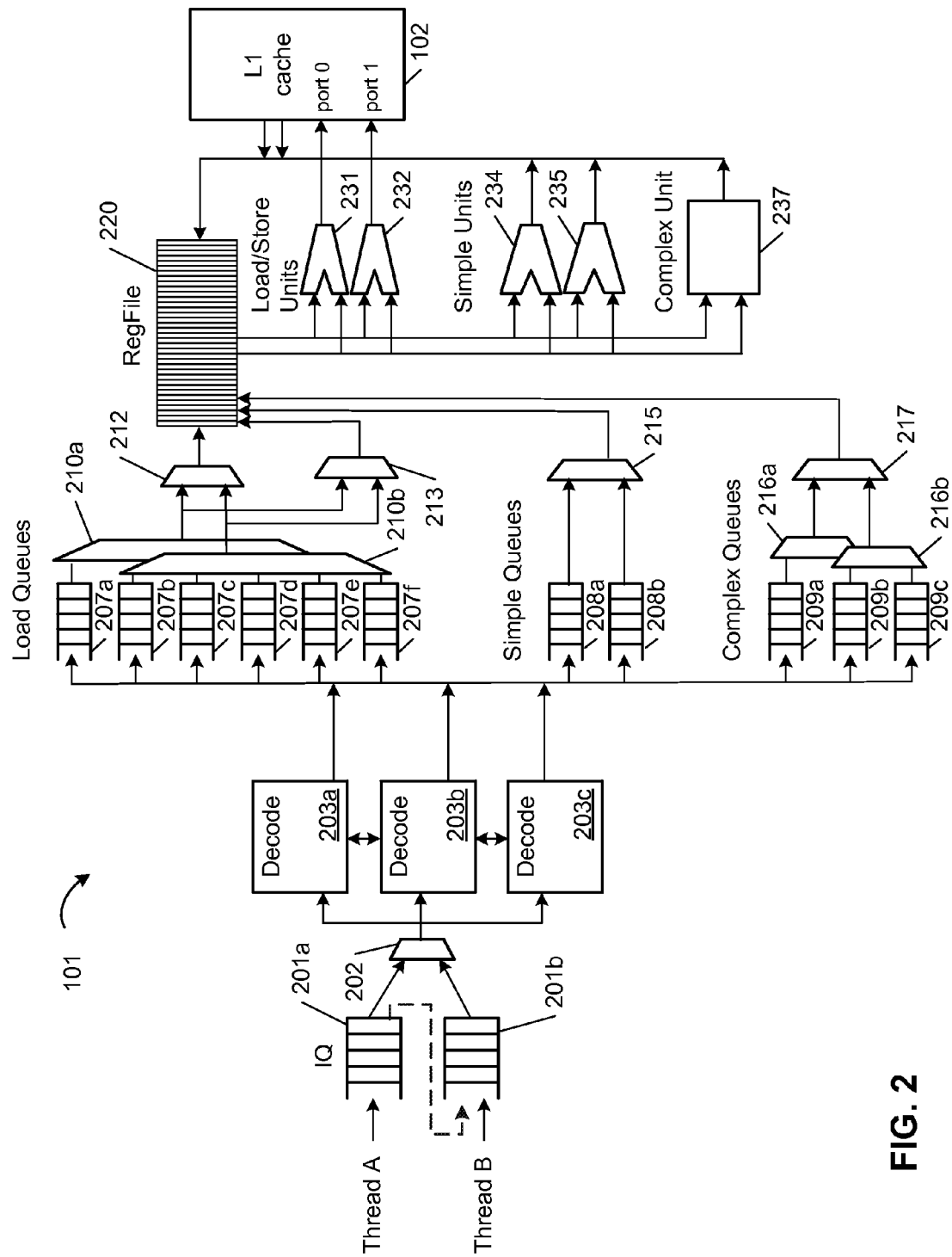
FIG. 2 is a block diagram showing one example of instruction flow in a multi-thread processor according to one embodiment of the disclosure.

FIG. 2 is a block diagram showing one example of instruction flow in multi-thread processor 101 according to one embodiment of the disclosure. In this example, processor 101 is configured for simultaneous multi-threading (SMT) execution of two instruction threads that are selected by an operating system (not shown). The instructions of the separate threads are received in separate instruction queues 201a and 201b (collectively, instruction queues 201). In various situations, two or more threads may start and end at different points in time. In various situations, two or more threads may start and/or end execution at the same time. During a time that multiple threads are being executed by a processor, a time duration of simultaneous execution, a variety of approaches can be used to share resources of the processor among the multiple threads.

As discussed in more detail below, the example in FIG. 2 also shows a thread selector 202 that passes instructions from instruction queues 201 to decode units 203a-c (collectively, decode units 203), which decode the instructions, perform dependency checks, and dispatch the instructions to downstream load/store instruction queues 207a-f (collectively, load queues 207), simple-execution instruction queues 208a-b (collectively, simple queues 208), and complex-execution instruction queues 209a-c (collectively, complex queues 209). From these downstream instruction queues 207, 208, 209, instructions are selected by selection units 210a-b and 216a-b and thread selectors 212, 213, 215, and 217 for operation on data stored in a register file 220. The operations are then carried out on data in register file 220 by suitable execution units, shown as load/store execution units 231 and 232, simple-execution units 234 and 235, and complex-execution unit 237. Execution units 231 and 232 are load/store units that load data from L1 cache 102 into registers of registry file 220, or store data from the registers into L1 cache 102.

In the illustrated example, thread selector 202 receives instructions for execution for a first thread, "thread A," from instruction queue 201a. Similarly, thread selector 202 receives instructions for execution for a second thread, "thread B," from instruction queue 201b. Thread selector 202 passes the instructions to decode units 203, which decode the instructions and dispatch the instructions to subsequent instruction queues 207, 208, 209. The example of FIG. 2 includes three decode units that operate in parallel, receiving one or more instructions from thread A, alternated with one or more instructions from thread B. Decode units 203 ascertain the type of each instruction and then dispatch the instruction onward accordingly. In the illustrated example, load and store instructions are dispatched to load queues 207. Simple-execution instructions (e.g., instructions that can be performed in one unit of processor cycles) are dispatched to simple queues 208, and complex-execution instructions (e.g., instructions that require multiple units of processor cycles) are dispatched to complex queues 209.

Decode units 203 also perform dependency checks on the instructions. For example, if decode units 203 receives an instruction (e.g., ADD R5←R0+R3) that depends on an earlier instruction (e.g., LOAD R0←{address}), then decode units 203 can take appropriate measures to prevent these instructions from being processed out-of-order in two separate queues downstream. In various situations, a flag can be set to ensure that the earlier instruction is completed before the latter instruction. In various situations, the decode units can collaborate to ensure that dependent instructions are simply dispatched to the same downstream queue.

In the illustrated example, the instruction flow includes six parallel queues for load or store instructions (load queues 207), two parallel queues for simple-execution instructions (simple queues 208), and three parallel queues for complex-execution instructions (complex queues 209). With this structure, each of the individual instruction queues 207a, 207b, 207c, 207d, 207e, 207f, 208a, 208b, 209a, 209b, 209c can be allocated to one of the current instruction threads.

One approach to partitioning or allocating the instruction queues and other resources among instruction threads is with a static dedication of queues to threads. For example, a simple model could be to constantly dedicate three of the load queues 207 to thread A and three of the load queues to thread B. However, this simple model could lead to inefficient use of resources. For example, during operation one of the threads, e.g., thread A, might experience a cache miss, where an instruction requires data that is not present in L1 cache 102. As a result, that thread would be paused or stalled, awaiting data retrieval from L2 or L3 cache memory. During this relatively long wait (e.g., 20+, 80+ cycles), various queues statically dedicated to that thread would be effectively wasted, instead of being used for processing of the other thread. Moreover, the static dedication of queues can hamper the ability of an operating system to prioritize the queues.

Another approach to queue allocation is to dynamically assign queues to threads based on priorities indicated by an operating system. In a basic example, an operating system may indicate that instructions are being provided in a single-thread mode, in which case only one instruction queue is needed (as indicated by the dashed line channeling the front of instruction queue 201a to the back of instruction queue 201b). In a further example, the operating system may instruct operation with two threads, with each thread accompanied by an indication of its priority (e.g., an ordinal indicator such as "level 3" or a qualitative indicator "65% guaranteed minimum processing" or a combination thereof). This approach can allow some degree of higher-level control over the allocation of resources. Such higher-level control, however, may be problematic since the relative importance of simultaneous threads is difficult to predict. In various situations, such prioritization can guarantee the execution time of one thread, but that guarantee may come at the expense of another thread. In various situations, the other thread may be effectively starved of resources. The execution time of the starved thread can become largely unpredictable in such situations.

As discussed below, the partitioning or allocating of instruction queues among threads can be done by a combination of reserving queues for threads and dynamically assigning queues to threads. This approach to partitioning resources can, in some implementations, alleviate situations of unfair resource allocation. This approach can also at least partially limit the maximum execution time of a thread being processed.

An example of this allocation of queues is illustrated by complex queues 209 and the associated downstream selection units 216a-b and thread selector 217. Decode units 203 are configured so that complex-execution instruction queue 209a receives instructions that arrived in instruction queue 201a. Similarly, the decode units are configured so that complex-execution instruction queue 209c receives instructions that arrived in instruction queue 201b. Thus, one of the complex-execution instruction queues is reserved for instructions from thread A, and one of the complex-execution instruction queues is reserved for instructions from thread B. The remaining complex-execution instruction queue, 209b, is dynamically assigned to thread A or thread B. For example, decode units 203 may be set to dispatch instructions from thread A (and not from thread B) to complex-execution instruction queue 209b during situations where thread A has a higher priority than thread B. This setting can be revised as needed. For example, complex-execution instruction queue 209b may be de-assigned from thread A if that thread is awaiting a retrieval due to a cache miss. The assignment of threads to complex-execution instruction queue 209b is dynamic, and can be re-assessed when a thread has concluded processing and a new thread commences, and/or when a thread is paused or stalled due to delaying factors, such as a cache miss.

In the example of FIG. 2, selection unit 216a is reserved for instructions that arrived in instruction queue 201a. Selection unit 216a receives instructions from the front of queue 209a, which is loaded with complex-execution instructions that arrived in thread A. Selection unit 216a also receives instructions from the front of queue 209b, but only if those instructions are also from thread A (e.g., when queue 209b is assigned to thread A). Similarly, in this example, selection unit 216b is reserved for instructions that arrived in instruction queue 201b. Selection unit 216b receives instructions from the front of queue 209c, which is loaded with complex-execution instructions that arrived in thread B. Selection unit 216b also receives instructions from the front of queue 209b, but only if those instructions are also from thread B (e.g., when queue 209b is assigned to thread B).

Selection units 216a and 216b feed into thread selector 217. In the illustrated example, thread selector 217 alternates between forwarding instructions from thread A (received via selection unit 216a) and forwarding instructions from thread B (received via selection unit 216b).

Another example of the allocation of queues among threads is illustrated by load queues 207 and the associated downstream selection units 210a-b and thread selectors 212 and 213. Decode units 203 are configured so that load/store instruction queue 207a receives instructions that arrived in instruction queue 201a. Similarly, the decode units are configured so that load/store instruction queue 207f receives instructions that arrived in instruction queue 201b. Thus, one of the load queues is reserved for load/store instructions from thread A, and one of the load queues is reserved for load/store instructions from thread B. The remaining load/store instruction queues, 207b-e, are temporarily assigned to thread A or thread B based on the current thread priorities and/or based on delays (e.g., cache misses), and/or other factors.

In the example of FIG. 2, selection unit 210a is reserved for instructions that arrived in instruction queue 201a, and selection unit 210b is reserved for instructions that arrived in instruction queue 201b. Selection unit 210a receives instructions from the front of queue 207a, which is loaded with load/store instructions that arrived in thread A, and from the front of any additional queues with instructions from thread A. Selection unit 210b receives instructions from the front of queue 207f, which is loaded with load/store instructions that arrived in thread B, and from the front of any additional queues with instructions from thread B.

Selection units 210a and 210b feed into thread selectors 212 and 213. In the illustrated example, thread selectors 212 and 213 each alternate between forwarding instructions from thread A (received via selection unit 210a) and forwarding instructions from thread B (received via selection unit 210b).

In the illustrated example, the two simple-execution instruction queues 208a and 208b are reserved for thread A and thread B, respectively. Decode units 203 are configured so that simple-execution instruction queue 208a receives simple-execution instructions that arrived in instruction queue 201a. Similarly, decode units 203 are configured so that simple-execution instruction queue 208b receives simple-execution instructions that arrived in instruction queue 201b.

In the illustrated example, simple-execution instruction queues 208a and 208b feed into thread selector 215. Thread selector 215 alternates between forwarding instructions from thread A (received via simple-execution instruction queue 208a) and forwarding instructions from thread B (received via simple-execution instruction queue 208b). (In other implementations, simple queue 208 can include one or more dynamically assigned queues.)

From the thread selectors 212, 213, 215, and 217, the instructions are passed along for execution on data in register file 220. In response to load/store instructions, data in register file 220 can be loaded from (or stored into) L1 cache 102 via load/store execution units 231 or 232 in the illustrated example. In various implementations, the register file can be dynamically partitioned or monitored to isolate or track data for separate threads. In some embodiments, L1 cache 102 includes two ports (illustrated as port 0 and port 1), each of which is prioritized or reserved for use by a single thread. For example, port 0 can be prioritized for load/store instructions from thread A, and port 1 can be prioritized for load/store instructions from thread B.

In response to simple-execution instructions, data in register file 220 can be processed by simple-execution units 234 or 235 in the illustrated example. In response to complex-execution instructions, data in register file 220 can be processed by complex-execution unit 237 in the illustrated example.

With the architecture illustrated in FIG. 2, various resources can be dynamically assigned among multiple threads. However, at least one load/store instruction queue, at least one simple-execution instruction queue, and at least one complex-execution instruction queue (207a, 208a, and 209a) are reserved for thread A in this example. Similarly, at least one load/store instruction queue, at least one simple-execution instruction queue, and at least one complex-execution instruction queue (207f, 208b, and 209c) are reserved for thread B in this example. These reservations provide some minimum guaranteed execution rate for each of the threads. Accordingly, upstream operations (e.g., operating system, software designers) may be able to expect some guaranteed (maximum) execution time for each thread.

The example illustrated in FIG. 2 depicts six queues for load/store instructions, two queues for simple-execution instructions, and three queues for complex-execution instructions, supporting a two-thread flow. In other embodiments, the design can be adapted to have other numbers of threads and other numbers of the various queues. For example, different implementations can have other numbers of queues that are reserved for each thread (e.g., three load queues, one simple-execution instruction queue, two complex-execution instruction queues for each thread), other numbers of queues that are dynamically assigned (e.g., five load queues, two simple-execution instruction queues, two complex-execution instruction queues shared among the threads), and other numbers of threads that are simultaneously executed (e.g., four threads). Moreover, the multi-thread flow can be replicated in multiple cores in a single integrated circuit. For example, in one implementation the illustration of FIG. 2 describes the flow in a single core of a dual-core microprocessor; two additional threads could be simultaneously executed in a second core (not shown) having the same architecture.

Various approaches to queue assignment are contemplated. In various implementations of a queue assignment procedure, a processor's various resources can be reassigned to a different thread when a first thread is stalled or inactive (e.g., awaiting an initialization or a fetch from memory). Alternatively, or in addition, a resource assignment procedure can include checks to guarantee a minimum set of resources to each of several threads.

Figure 3:
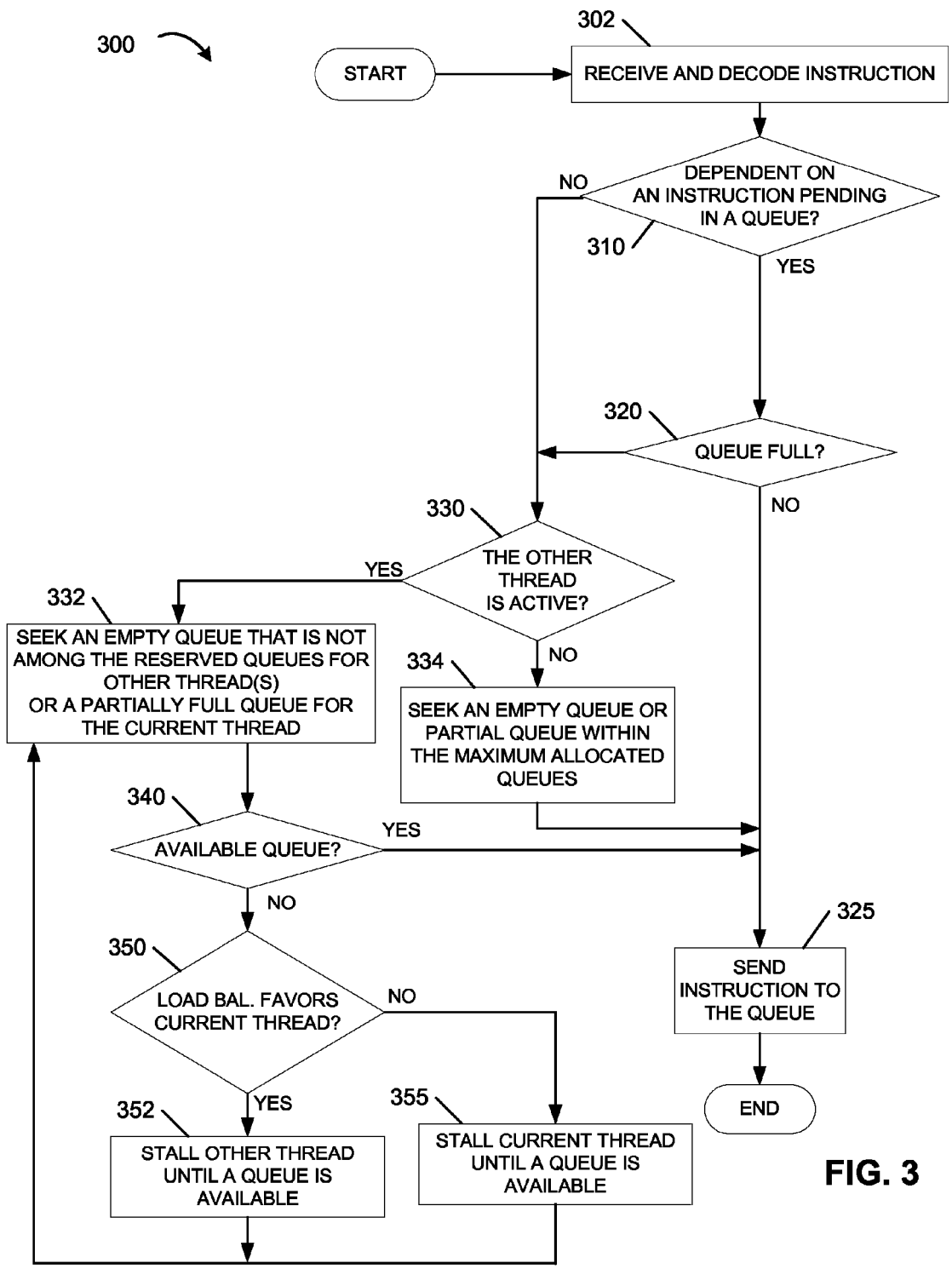
FIG. 3 is a flow diagram showing an example of a queue allocation procedure according to one embodiment of the disclosure.

FIG. 3 is a flow diagram showing an example of a queue allocation procedure 300 according to one embodiment of the disclosure. Procedure 300 begins with receiving and decoding a current instruction from a current instruction thread in act 302. In act 310, the current instruction is checked for dependency on any pending instructions (that may be in a queue awaiting execution). If the current instruction does not depend on any unexecuted prior instructions, the procedure continues to act 330.

If act 310 determines that the current instruction does depend on a pending prior instruction from the same thread, an attempt is made to dispatch the current instruction to the same queue as the queue in which the latest related prior instruction is pending (the "prior-instruction queue"). In act 320, the prior-instruction queue is checked to determine whether it is full or can accept the current instruction. If the prior-instruction queue is not full and is appropriate for the current instruction's type (e.g., the current instruction is a simple-execution instruction and the prior-instruction queue is a simple-execution instruction queue or a complex-execution instruction queue), the current instruction is dispatched to the prior-instruction queue (act 325) and the procedure ends. Otherwise, the procedure continues to act 330 and alternative measures (e.g., completion flags, not shown) can be taken to avoid execution of the current instruction before completion of the related prior instructions.

In act 330, a determination is made of whether any other thread(s) are active. If a processor is operating in a multi-thread mode, the procedure continues to act 332, seeking a queue that is appropriate for the current instruction's type. The selection of a queue in act 332 is also based on allocation limits for each thread. The selection of a queue for the current instruction allocates that queue to the corresponding current thread. Thus, the selection of a queue may be delayed if allocating a queue to the current thread would violate limits on the number of queues that can be allocated to a particular thread. These numerical limits can be imposed by hardware or software or a combination thereof.

In various implementations, a minimum number of queues is reserved for each possible simultaneous thread (e.g., one load/store instruction queue, one simple-execution instruction queue, and one complex-execution instruction queue for each thread in a two-thread processor, as shown in the example of FIG. 2; or other combinations of queue numbers and thread numbers). In other implementations, queues may be reserved for one or some of the threads but not for all of the threads. In various embodiments, the minimum number of reserved threads is intrinsic in circuitry, e.g., as part of a processor's design or otherwise implemented in hardware. In some implementations, additional limits can be requested by software, such as by an operating system that provides threads to a processor.

Consider an example where a processor hardware is implemented for simultaneous two-thread operation, with a total of six load/store instruction queues (load queues) and with reservations that a minimum of one load queue should always be available for each thread. Further in this example, a situation may arise in which an operating system indicates that a new thread should be allocated a minimum of two load queues and a maximum of six load queues. In this situation, the new thread would not be allocated more than five load queues, because doing so would prevent the other thread from having the hardware-designated minimum of one load queue. Also, if the other thread were already allocated five load queues (out of the six total load queues), then the processor would temporarily stall (stop or slow down) the other thread until it was using only four of the load queues. This would make two load queues (the software-requested minimum) available for the new thread. Further, consider a situation where the operating system requests that each of two threads be allocated a minimum of three queues and maximum of five queues. Under various conditions, this request could assist the processor to provide substantially equal allocation and substantially maximum usage of the queues (and other resources).

In various implementations, act 332 verifies the numerical constraints on queues to be allocated to the various threads prior to assigning the current instruction to a queue. A candidate queue can be an empty queue, or the candidate queue can be a partially-full queue that already holds prior instructions from the current thread. If the candidate queue is an empty queue, then act 332 first confirms that allocating the empty queue to the current thread would not leave fewer than a reserved minimum number of queues for any other thread(s).

The procedure continues to act 340, determining whether the act 332 was successful. If an appropriate queue was available within the numerical limits, then act 325 dispatches the current instruction to that queue and the procedure ends. Otherwise, if the queue selection in act 332 was unsuccessful (e.g., each queue is either full with instructions from the current thread or is currently allocated to another thread, or is reserved for another thread), then a fairness determination is made in act 350. This determination ascertains whether various factors weigh in favor of the current thread (the thread that is the source of the current instruction) over all other threads. The determination in act 350 can be based, for example, on load-balancing considerations, cache-fetch times, the number of queues currently allocated to each of the threads, priority factors for one or more of the threads, and other factors, or combinations thereof. In one implementation, act 350 ascertains whether fewer than 1/n of the total number of queues are allocated to the current thread (where n is the maximum number of threads for simultaneous multiprocessing).

If the determination in act 350 favors the current thread, then the procedure continues to act 352, where one or more other threads are temporarily paused or stalled. Execution of the already-queued instructions continues for those threads. Then, e.g., when one of the currently full same-thread queues is no longer full, or one of the other-thread queues is empty, operation resumes and then loops back to act 332 to seek a suitable queue for the current instruction.

Otherwise, if the determination in act 350 favors one or more of the other threads, the procedure continues to act 355, where the current thread is temporarily paused or stalled until a queue is available. Procedure 300 then loops back to act 332 to seek a suitable queue for the current instruction.

With reference back to act 330, if a determination is made that no other thread(s) are active, the procedure continues to act 334. In act 334, a queue is selected for dispatching the current instruction. The selected queue can be empty or partially full, and should be appropriate for receiving the current instruction (e.g., a load queue for a load/store instruction; a complex-execution instruction queue for a complex-execution instruction or a dependent simple-execution instruction), and should not be among a minimum number of queues reserved for other threads. If no appropriate queues are available, act 334 can temporarily stall the thread until a queue is available for selection (e.g., appropriate queue type, not violating minimum queue reservation number for other queues). Act 325 then dispatches the current instruction to the selected queue and the procedure ends.

In various embodiments, the functionality and/or operations described herein (e.g., with reference to FIG. 3) may be implemented by one or more of the systems and/or apparatuses described herein (e.g., with reference to FIGS. 1-2).

It is to be understood that the architectures depicted herein are merely exemplary, and that in fact many other architectures can be implemented that use the techniques described herein. In various implementations, the illustrated elements of systems disclosed herein are circuitry located on a single integrated circuit or within a same device. Alternatively, the systems may include any number of separate integrated circuits or separate devices interconnected with each other. Also for example, a system or portions thereof may be soft or code representations of physical circuitry or of logical representations convertible into physical circuitry. As such, a system may be embodied in a hardware description language of any appropriate type.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the present disclosure has been described in considerable detail with reference to certain preferred versions thereof, other versions and variations are possible and contemplated. Those skilled in the art should appreciate that they can readily use the disclosed conception and specific embodiments as a basis for designing or modifying other structures for carrying out the same purposes of the present disclosure without departing from the spirit and scope of the disclosure as defined by the appended claims.

What is claimed is:

1. A method comprising:
   decoding a received instruction from a first thread executing on a processor to produce a decoded instruction, wherein
       a first set of instruction queues is allocated to the first thread,
       a second set of instruction queues different from the first set of instruction queues is allocated to a second thread executing on the processor,
       the first thread and the second thread are configured to execute simultaneously, and
       the processor comprises a plurality of instruction queues that comprises the first and second sets of instruction queues;
   in response to a first determination that each of the first set of instruction queues is full after decoding the received instruction from the first thread,
       determining whether an empty queue of the plurality of instruction queues is available to be allocated to the first thread;
   in response to a second determination that no empty queue is available to be allocated to the first thread after decoding the received instruction from the first thread,
       performing a fairness determination based on priority of the first thread and the second thread;
   in response to the first thread having a higher fairness indicator than the second thread:
       stalling the second thread temporarily while executing already-queued decoded instructions in the first and second sets of instruction queues until a candidate queue becomes available, wherein the candidate queue is selected from a group of:
           a first allocated queue of the first set of instruction queues that is no longer full, and
           a second allocated queue of the second set of instruction queues that becomes empty;
   in response to the first thread not having a higher fairness indicator than the second thread:
       stalling the first thread temporarily while executing already-queued decoded instructions in the first and second sets of instruction queues until the candidate queue becomes available;
   dispatching the decoded instruction to the first allocated queue becoming the candidate queue, in response to the first allocated queue being no longer full;
   re-allocating the second allocated queue becoming the candidate queue to the first thread, in response to the second allocated queue becoming empty; and
   dispatching the decoded instruction to the second allocated queue, in response to the re-allocating the second allocated queue.

2. The method of claim 1, wherein the performing the fairness determination is further based at least in part on one or more of: a load-balancing consideration, a cache-fetch time, a count of queues currently allocated to the first thread, maximum queue allocation limits for the first and second threads, and minimum queue allocation limits for the first and second threads.

3. The method of claim 1, further comprising:
   re-assigning one of the first set of instruction queues to the second thread, in response to the first thread being stalled.

4. The method of claim 3, wherein the first thread is stalled in response to the first thread experiencing a cache miss.

5. The method of claim 1, further comprising:
   receiving a second decoded instruction associated with a new thread executing on the processor, wherein the new thread is configured to execute simultaneously with the first thread and the second thread;
   in response to a third determination that no empty queue is available to be allocated to the new thread,
       stalling the first thread and the second thread while executing decoded instructions in the first and second sets of instruction queues until one of the first and second sets of instruction queues becomes an empty queue;
   allocating the empty queue to the new thread; and
   dispatching the second decoded instruction to the empty queue.

6. The method of claim 5, wherein
   the new thread is associated with a minimum allocation queue limit of one or more queues, and
   the stalling the first thread and the second thread continues until the minimum allocation queue limit is met.

7. The method of claim 1, wherein the first set of instruction queues comprises N queues of a first instruction type, wherein the first instruction type is one of: a load/store instruction type, a simple-execution instruction type, and a complex-execution instruction type, and wherein the method further comprises:
   determining that the first thread has a minimum requested guarantee of M queues of the first instruction type;
   determining that more than N-M queues of the first instruction type are assigned to receive instructions from the second thread;
   temporarily stalling the second thread until M queues of the first instruction type are available to receive instructions from the first thread; and
   assigning M queues to receive instructions of the first instruction type from the first thread.

8. The method of claim 7, wherein
   instructions of the simple-execution instruction type are each configured to be performed in one unit of processor cycles, and
   instructions of the complex-execution instruction type are each configured to be performed in multiple units of processor cycles.

9. The method of claim 1, further comprising:
   prioritizing a first port of a data cache for load/store instructions of the first thread; and
   prioritizing a second port of the data cache for load/store instructions of the second thread.

10. The method of claim 1, wherein
    the second determination that no empty queues are available to be allocated to the first thread is based on the first set of instruction queues meeting a maximum queue limit.

11. A system comprising:
    a processor comprising:
    a plurality of instruction queues, the plurality of instruction queues comprising:
        a first set of queues, and
        a second set of queues;
    one or more execution units configured to execute decoded instructions in the first and second sets of queues; and
    one or more dispatch units, wherein the one or more dispatch units are configured to:

provide the first set of queues with decoded instructions from a first thread among a plurality of simultaneous instruction threads, provide the second set of queues with decoded instructions from a second thread among the plurality of simultaneous instruction threads, decode a received instruction from the first thread to produce a decoded instruction, in response to a first determination that each of the first set of queues is full after the received instruction is decoded, determine whether an empty queue of the plurality of instruction queues is available to be allocated to the first thread, in response to a second determination that no empty queue is available to be allocated to the first thread after the received instruction is decoded, perform a fairness determination based on priority of the first thread and the second thread, in response to the first thread having a higher fairness indicator than the second thread, stall the second thread temporarily while the one or more execution units execute already-queued decoded instructions in the first and second sets of queues until a candidate queue becomes available, wherein the candidate queue is selected from a group of:
 a first allocated queue of the first set of queues that is no longer full, and
 a second allocated queue of the second set of queues that becomes empty, in response to the first thread not having a higher fairness indicator than the second thread, stall the first thread temporarily while the one or more execution units execute already-queued decoded instructions in the first and second sets of queues until the candidate queue becomes available, dispatch the decoded instruction to the first allocated queue becoming the candidate queue, in response to the first allocated queue being no longer full, re-allocate the second allocated queue becoming the candidate queue to the first thread, in response to the second allocated queue becoming empty, and dispatch the decoded instruction to the second allocated queue, in response to the re-allocation of the second allocated queue.

12. The system of claim 11, wherein:
the plurality of instruction queues comprises a plurality of load/store queues, a plurality of simple-execution queues, and a plurality of complex-execution queues;
the load/store queues comprises two thread-reserved load/store queues and at least one dynamically assignable load/store queue;
the simple-execution queues comprises two thread-reserved simple-execution instruction queues;
the complex-execution queues comprises two thread-reserved complex-execution queues and at least one dynamically assignable complex-execution queue;
the dispatch units are configured to provide load instructions and store instructions to the load/store queues;
the dispatch units are configured to provide simple-execution instructions and load/store instructions to the simple-execution queues;
the dispatch units are configured to provide complex-execution instructions, simple-execution instructions, and load/store instructions to the complex-execution queues.

13. The system of claim 11, wherein at least one of the one or more dispatch units is configured to perform the fairness determination further based at least in part on one or more of: a load-balancing consideration, a cache-fetch time, a count of queues currently allocated to one or more of the threads, and maximum and minimum queue allocation limits for one or more of the first and second threads.

14. The system of claim 11, wherein at least one of the one or more dispatch units is configured to re-assign at least one of the first set of queues to the second thread, in response to the first thread being paused.

15. The system of claim 14, wherein the first thread is paused in response to a cache miss for the first thread.

16. The system of claim 11, further comprising:
a data cache, wherein the data cache comprises
 a first port prioritized for the first thread, and
 a second port prioritized for the second thread.

17. A method comprising:
providing decoded instructions from a first thread, among a plurality of instruction threads executing simultaneously, to a first set of queues among a plurality of instruction queues in a processor, wherein instructions in the first set of queues are executed by the processor;

providing decoded instructions from a second thread, among the plurality of instruction threads, to a second set of queues among the plurality of instruction queues, wherein instructions in the second set of queues are executed by the processor;

decoding a received instruction from the first thread to produce a decoded instruction;

in response to a first determination that each of the first set of queues is full after decoding the received instruction from the first thread, determining whether an empty queue of the plurality of instruction queues is available to be allocated to the first thread;

in response to a second determination that no empty queue is available to be allocated to the first thread after decoding the received instruction from the first thread, performing a fairness determination based on priority of the first thread and the second thread;

in response to the first thread having a higher fairness indicator than the second thread, stalling the second thread temporarily while already-queued decoded instructions in the first and second sets of queues are executed until a candidate queue becomes available, wherein the candidate queue is selected from a group of:
 a first allocated queue of the first set of queues that is no longer full, and
 a second allocated queue of the second set of queues that becomes empty;

in response to the first thread not having a higher fairness indicator than the second thread, stalling the first thread temporarily while already-queued decoded instructions in the first and second sets of queues are executed until the candidate queue becomes available;

dispatching the decoded instruction to the first allocated queue becoming the candidate queue, in response to the first allocated queue being no longer full;

re-allocating the second allocated queue becoming the candidate queue to the first thread, in response to the second allocated queue becoming empty; and dispatching the decoded instruction to the second allocated queue, in response to the re-allocating the second allocated queue.

* * * * *